(12) United States Patent
Naguthanawala et al.

(10) Patent No.: US 10,117,098 B1
(45) Date of Patent: Oct. 30, 2018

(54) USER AUTHENTICATION VERIFICATION SERVICE

(71) Applicant: Amazon Technologies, Inc., Seattle, WA (US)

(72) Inventors: Murtuza Naguthanawala, Sammamish, WA (US); Yaxin Huang, Seattle, WA (US); Nicholas Sun, Mercer Island, WA (US); Srikanth Veerapaneni, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/627,247

(22) Filed: Jun. 19, 2017

(51) Int. Cl.
*H04W 12/06* (2009.01)
*H04M 3/436* (2006.01)
*H04L 29/08* (2006.01)
*H04L 29/06* (2006.01)

(52) U.S. Cl.
CPC ............ *H04W 12/06* (2013.01); *H04L 63/08* (2013.01); *H04L 63/083* (2013.01); *H04L 63/0876* (2013.01); *H04L 63/18* (2013.01); *H04L 67/26* (2013.01); *H04M 3/436* (2013.01); *H04M 2203/6072* (2013.01)

(58) Field of Classification Search
CPC ................. H04M 3/382; H04M 3/436; H04M 2203/6045; H04M 2203/6081; H04M 3/42034; H04M 3/42059; H04M 2203/6072; H04M 3/5166; H04M 3/42042; H04M 2203/40; H04M 2203/558; H04M 3/42068; H04W 12/06; H04W 4/16; H04W 76/10; H04L 63/0815; H04L 9/321
See application file for complete search history.

(56) References Cited

U.S. PATENT DOCUMENTS

| | | | |
|---|---|---|---|
| 9,762,728 B1 * | 9/2017 | Cox ....................... | H04M 3/382 |
| 2014/0068033 A1 * | 3/2014 | Berger ................ | H04L 41/0813 709/221 |
| 2016/0103981 A1 * | 4/2016 | Boss ....................... | G06F 21/31 726/7 |
| 2017/0346815 A1 * | 11/2017 | Andrews ............. | H04L 63/0853 |
| 2018/0139206 A1 * | 5/2018 | Ezell ................... | H04L 63/0876 |

* cited by examiner

*Primary Examiner* — Nam Huynh
(74) *Attorney, Agent, or Firm* — Knobbe, Martens, Olson & Bear, LLP (57) ABSTRACT

Systems and methods are described for authenticating parties who communicate via unauthenticated channels. A user authentication verification service receives a request to confirm the identity of a party who communicates via an unauthenticated channel. The user authentication verification service may identify a computing device associated with the claimed user identity, and may determine that the computing device (or an application installed on the computing device) can be used to authenticate the user. The user authentication verification service may thus transmit a push notification or other request to the computing device to request authentication from the user that the party claims to be or represent. The user authentication verification service may then receive information from the computing device, confirm that the information authenticates that the party is the user (or is acting on behalf of the user), and authorize communication via the unauthenticated channel.

20 Claims, 8 Drawing Sheets

USER AUTHENTICATION VERIFICATION SERVICE

BACKGROUND

Generally described, operators of networked servers and computing environments (referred to generally as "network sites") may communicate with users through a variety of channels. For example, operators of network sites may communicate with users through an operator-provided network, through a third-party network, or through a network of networks (e.g., the Internet). These networks may support various mechanisms to secure and authenticate communications, thereby enabling the network site operator to verify the identity of a user communicating via the channel.

Operators of network sites may also communicate with users through channels that have limited or no support for authenticating user identities. Verifying the identities of users who communicate via these channels may require additional effort, or in some instances it may not be possible to verify the identity of a user of a particular communications channel.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to user authentication. More specifically, aspects of the present disclosure are directed to systems, methods, and computer-readable media related to authenticating a user who communicates via an unauthenticated channel. Illustratively, a user may communicate with a networked computing environment, with the operator of a networked computing environment, or with a service provided by the operator, through an unauthenticated channel. For example, a user may initiate communications by voice using a telephone network, and may contact a service provided by the operator of the networked computing environment, such as a technical support center or a customer service hotline. As further examples, a user may initiate communications via instant messaging, text messaging, or via a network or service that anonymizes communication, such as a Tor router or an anonymous email server.

As used herein, a channel or message may be described as "unauthenticated" when the identity of the communicating party has not been authenticated. For example, an instant messaging service that delivers messages from an unverified account may be described as an unauthenticated channel. It will be understood that authenticated messages (e.g., from an authenticated user) can be delivered via an unauthenticated channel, and that messages delivered via an authenticated channel are always authenticated. A channel may further be described as "insecure" when the channel is not protected from third-party eavesdropping. For example, a public comments section on a web server would be considered an insecure communication channel.

A user may thus communicate with the operator of a networked computing environment via an unauthenticated channel, and may request access to information, goods, or services that the operator makes available only to the authenticated user. The operator may verify the user's identity by, for example, communicating via the unauthenticated channel to request that the user provide information that authenticates or verifies the user's identity. However, the operator's ability to collect authentication information via an unauthenticated channel may be limited. For example, authentication may require that the user supply private information, and communicating such information over an insecure channel would defeat the purpose of authentication. As a further example, some types of authentication information (e.g., user logins and passwords) may be inefficient and cumbersome to communicate via certain channels, such as a voice telephone channel.

To overcome these difficulties, an operator of a network site may implement a user authentication verification service. A user authentication verification service, in some embodiments, may authenticate a user by identifying a suitable channel for authenticating a claimed identity, collecting authentication information via the suitable channel, and confirming that the party communicating via the unauthenticated channel is in fact the user.

It will be understood that the user authentication verification service described herein improves the performance of a computer at the task of authenticating users, and provides a novel and distinct process for automating a task that was previously performed by humans. By implementing the user authentication verification service, the operator of a network site may replace manual verification of user identity (e.g., verbally asking the user to provide authentication information over the phone) with the automated processes (e.g., determining that a mobile computing device can authenticate the user's identity) described herein. It will further be understood that the user authentication verification service described herein addresses a technical problem that specifically arises in the realm of computer networks, where a user's identity may be uncertain due to inherent or designed limitations in those computer networks.

The foregoing aspects and many of the attendant advantages will become more readily appreciated as the same become better understood by reference to the following detailed description, when taken in conjunction with the accompanying drawings.

Figure 1:
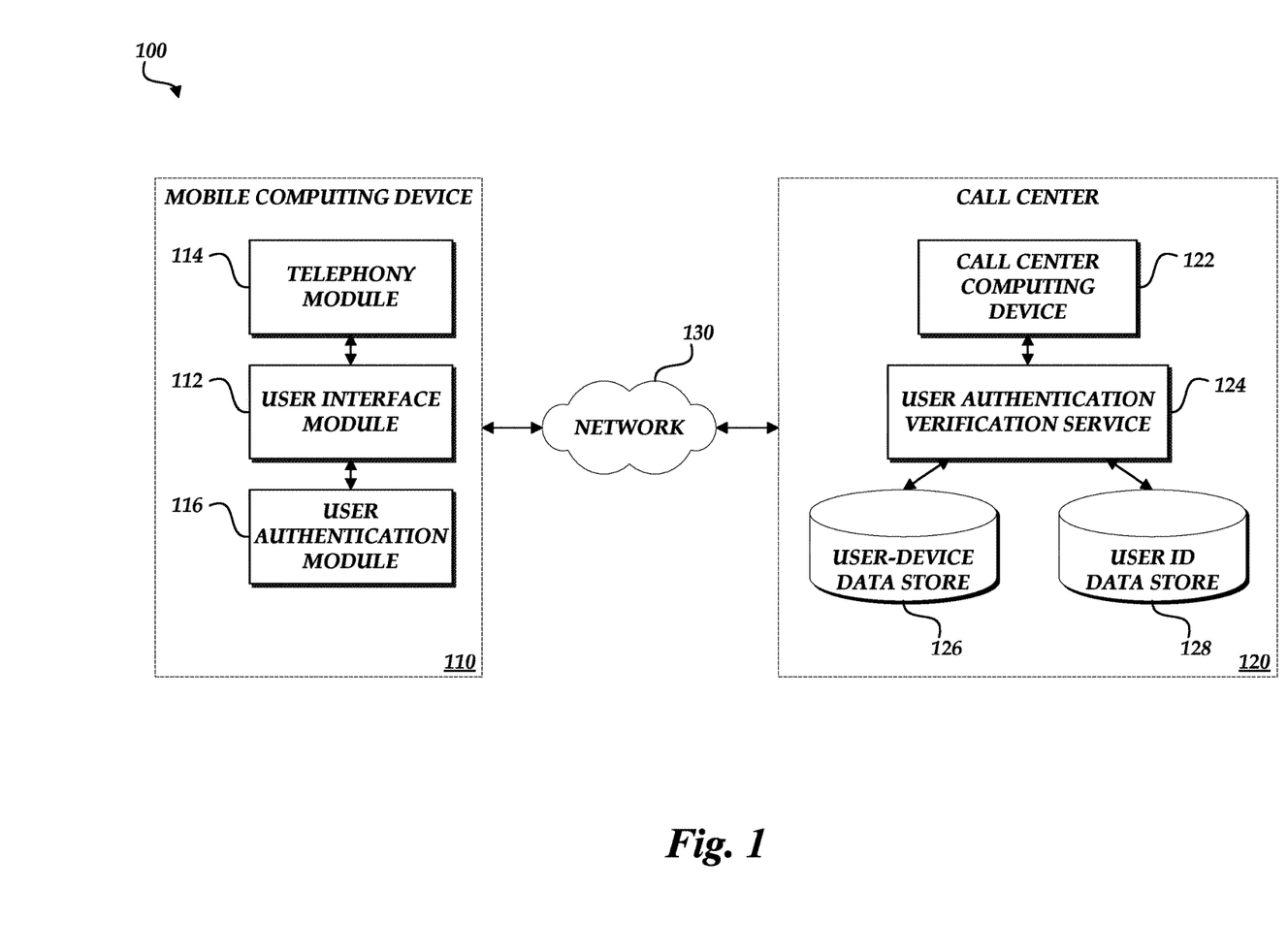
FIG. 1 is a functional block diagram depicting an illustrative network environment for implementing a user authentication verification system in accordance with aspects of the present disclosure.

FIG. 1 is a functional block diagram depicting an illustrative network environment 100 for implementing a user authentication verification service in accordance with aspects of the present disclosure. The illustrated network environment 100 depicts a mobile computing device 110 communicating with computing devices in a call center 120 via a network 130.

The mobile computing device 110 is described in more detail below with reference to FIG. 5, and may illustratively include at least a user interface module 112, telephony module 114, and a user authentication module 116. In some embodiments, the mobile computing device 110 may implement all or part of a user authentication verification service in accordance with aspects of the present disclosure. In other embodiments, the mobile computing device 110 may communicate via the network 130 with a call center computing device 122 or a user authentication verification service 124, which may either, jointly, or both implement a user authentication verification service.

The call center 120 may illustratively be a customer service center, technical support hotline, help desk, or other communications center that receives voice communications via telephone. While a call center 120 is depicted in FIG. 1 for purposes of example, aspects of the present disclosure include any point of contact provided by the operator of the network site that receives any form of unauthenticated communications. In various embodiments, the call center 120 may thus be a social media account, interactive web service, "chatbot," email account, or other message recipient.

The call center 120 may include a call center computing device 122. The call center computing device 122 may illustratively be any computing device that implements aspects of the present disclosure, including but not limited to aspects such as receiving unauthenticated communications. In some embodiments, the call center computing device 122 may implement a user authentication verification service 124, which is described in more detail below with reference to FIG. 6. In other embodiments, the call center computing device 122 may communicate (directly, via the network 130, or via another network) with a separately implemented user authentication verification service 124.

The user authentication verification service 124 may communicate with one or more data stores, such as a user-device data store 126 and a user ID data store 128. Illustratively, the user-device data store 126 may store associations between users and devices, and the user ID data store 128 may store information that enables authentication of users. The data stores 126 and 128 may each illustratively be any non-transient computer-readable medium, including but not limited to hard drives, solid state devices, flash memories, EEPROMs, or other storage media. In various embodiments, the data stores 126 and 128 may each be implemented as a database, a database server, a component of another server or service (e.g., user authentication verification service 124), or may be combined with the call center computing device 122 and made internal to the call center computing device 122. In other embodiments, one or more of the user authentication verification service 124, user-device data store 126, or user ID data store 128 may be external to the call center 120. Still further, in some embodiments, the data stores 126 and 128 may be implemented as a single data store or distributed across multiple data stores.

The network 130 may be any wired or wireless network, including but not limited to a local area network (LAN), wide area network (WAN), public switched telephone network (PSTN), mesh network, cellular telecommunications network, the Internet, or any other public or private communications network or networks. In some embodiments, the mobile computing device 110 may communicate with the call center 120 via multiple networks 130, or via different channels (which may be authenticated or unauthenticated) on the same network 130.

It will be understood that many of the components described in FIG. 1 are optional, and that embodiments of the present disclosure may combine or reorganize the components. Furthermore, the components need not be distinct or discrete. For example, the call center computing device 122 and the user authentication verification service 124 may be represented in a single physical device, or, alternately, may be split into multiple physical devices.

Figure 2:
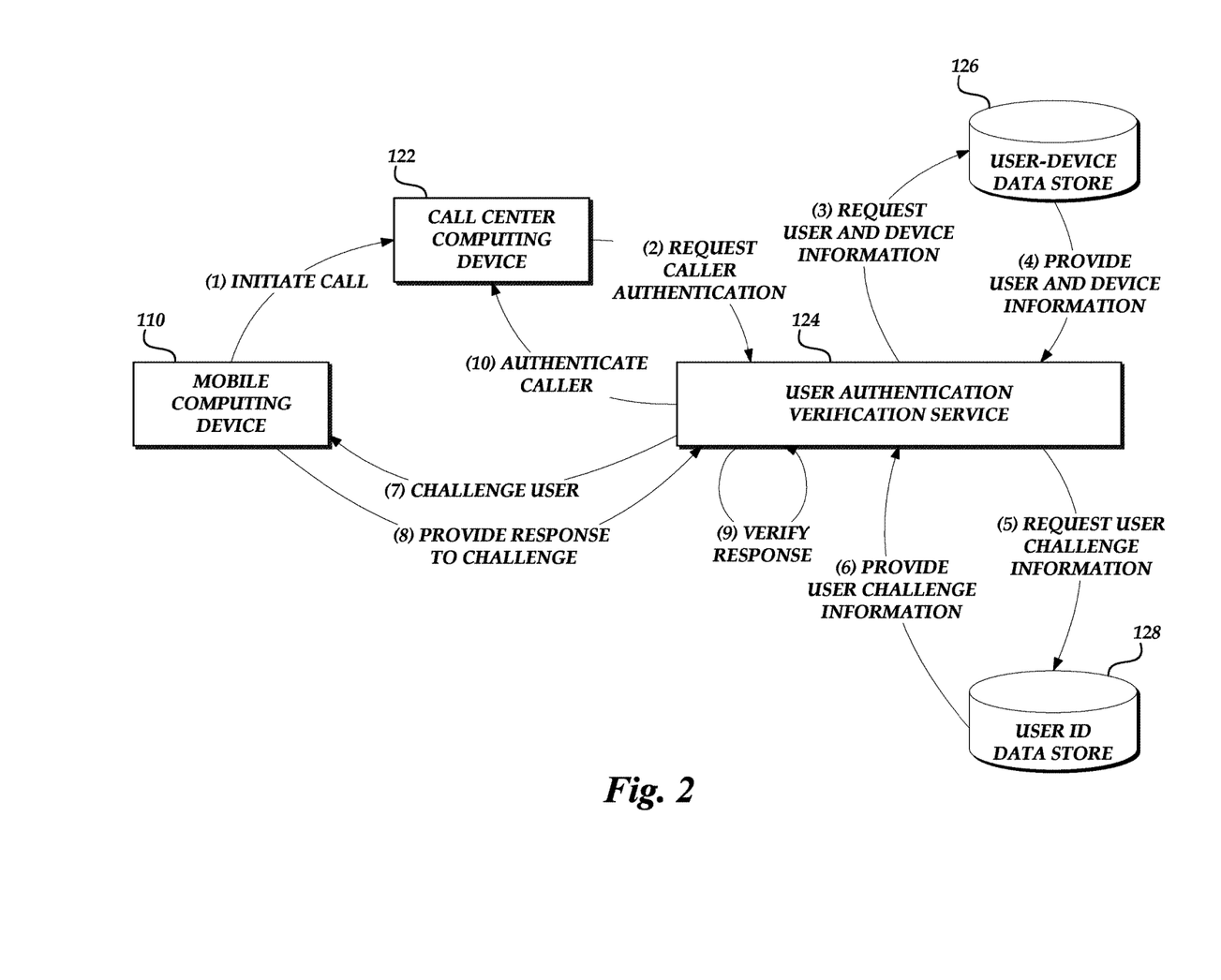
FIG. 2 is an illustrative block diagram depicting authentication and verification of a claimed user identity in accordance with aspects of the present disclosure.

FIG. 2 is an illustrative block diagram depicting user authentication and verification that a calling party is the person the caller claims to be, in accordance with aspects of the present disclosure. At (1), a first party may initiate communications with a call center computing device 122 via a mobile computing device 110 and an unauthenticated channel. Illustratively, the mobile computing device 110 may be a smartphone, and the first party may place a voice telephone call to a call center computing device 122 using the telephony features of the smartphone. In various other embodiments, the first party may initiate communications via short message service (SMS), multimedia message service (MMS), instant messaging, email, social media, or other channels. In further embodiments, the first party may initiate communications from a different computing device than the mobile computing device 110. The first party may, in some embodiments, provide identifying information. For example, the first party may verbally claim to be a particular user. In other embodiments, the unauthenticated channel may provide identifying information (e.g., caller ID), or the mobile computing device 110 may provide identifying information (e.g., an IMEI, MAC address, or other device identifier).

At (2), the call center computing device 122 may request that the user authentication verification service 124 authenticate the identity of the first party, and may provide the identifying information. At (3), the user authentication verification service 124 may request that the user-device data store 126 provide user and device information that corresponds to the identifying information, and at (4) may receive information regarding a device or devices that are associated with a particular user. As described above, the identifying information may correspond to a user identifier, a device identifier, or both. The user authentication verification service 124 may thus provide identifying information associated with a particular user, and the information retrieved from the user-device data store 126 may identify a set of devices associated with that particular user. Alternatively, in some embodiments, the identifying information may be associated with a particular device, and the information retrieved from the user-device data store 126 may include (i) a particular user who is associated with that particular device, and (ii) information regarding a set of devices associated with that user (including the device associated with the identifying information).

At (5), the user authentication verification service 124 may request information from the user ID data store 128 that enables authentication of the user, and at (6) the user authentication verification service 124 may receive the requested information. For example, the user authentication verification service 124 may request a challenge-response question and answer (e.g., an account security question). In some embodiments, the user authentication verification service 124 may instead determine that the mobile computing device 110 can authenticate the user using information or capabilities that the mobile computing device 110 already has. For example, the user authentication verification service 124 may determine that the mobile computing device 110 is equipped with a fingerprint reader, voiceprint reader, that it already possess information (e.g., an account password) that can authenticate the user, or that an application on the mobile computing device 110 can authenticate the user. In further embodiments, the user authentication verification service 124 may determine that such an application is installed on the mobile computing device 110. In other embodiments, the user authentication verification service 124 may determine that another device of the set of devices can authenticate the user.

At (7), the user authentication verification service 124 may request that the mobile computing device 110 authenticate the user. In some embodiments, the user authentication verification service 124 may transmit a push notification, text message, or other message to the mobile computing device 110 to initiate user authentication. For example, the user authentication verification service 124 may transmit a push notification that is delivered to the application on the mobile computing device 110, and that causes the mobile computing device 110 to request a fingerprint scan, voiceprint scan, password entry, answer to a security question, or otherwise authenticate the user.

At (8), the user authentication verification service 124 may receive information that the user provided in response to the authentication request. Illustratively, the information may be an answer to a challenge-response question, an affirmative response to a text message, fingerprint or voiceprint data, or the like. In some embodiments, the information provided at (8) may be confirmation that the mobile computing device 110 (or an application on the mobile computing device 110) successfully authenticated the user.

At (9), in some embodiments, the user authentication verification service 124 may verify that the response received from the mobile computing device 110 authenticates the user. For example, the user authentication verification service 124 may verify that a response to a challenge question was the correct response, that an entered password was the correct password, or that fingerprint data or voiceprint data corresponds to information on file for the user in question (which may be obtained at (6) above). At (10), the user authentication verification service 124 may respond to the request at (2) by verifying that the caller's identity has been confirmed to be the user in question.

In some embodiments, the user authentication verification service 124 may verify that a caller is acting on behalf of a user rather than that the caller is the user, and may ask the user to authenticate and confirm that the caller is acting with their approval or on their behalf. In various embodiments, as described in more detail below with reference to FIG. 4, the user authentication verification service 124 may report that it could not identify a user corresponding to the provided identifying information, that it could not authenticate the user (e.g., that it could not find a suitable device and communications channel for authenticating the user, or that the request to authenticate timed out without a response), that the user declined to authenticate, or that the user failed to authenticate.

It will be understood that the interactions depicted in FIG. 2 are provided for purposes of example, and that other interactions and other variations in the order of interactions are within the scope of the present disclosure. For example, the user authentication verification service 124 may query a single data store for information regarding both users and associated devices. As a further example, the user authentication verification service 124 may provide information to the call center computing device 122 that enables the call center computing device 122 to request and receive user authentication, rather than the user authentication verification service 124 communicating directly with the mobile computing device 110. The interactions depicted in FIG. 2 are thus understood to be illustrative and not limiting.

Figure 3A:
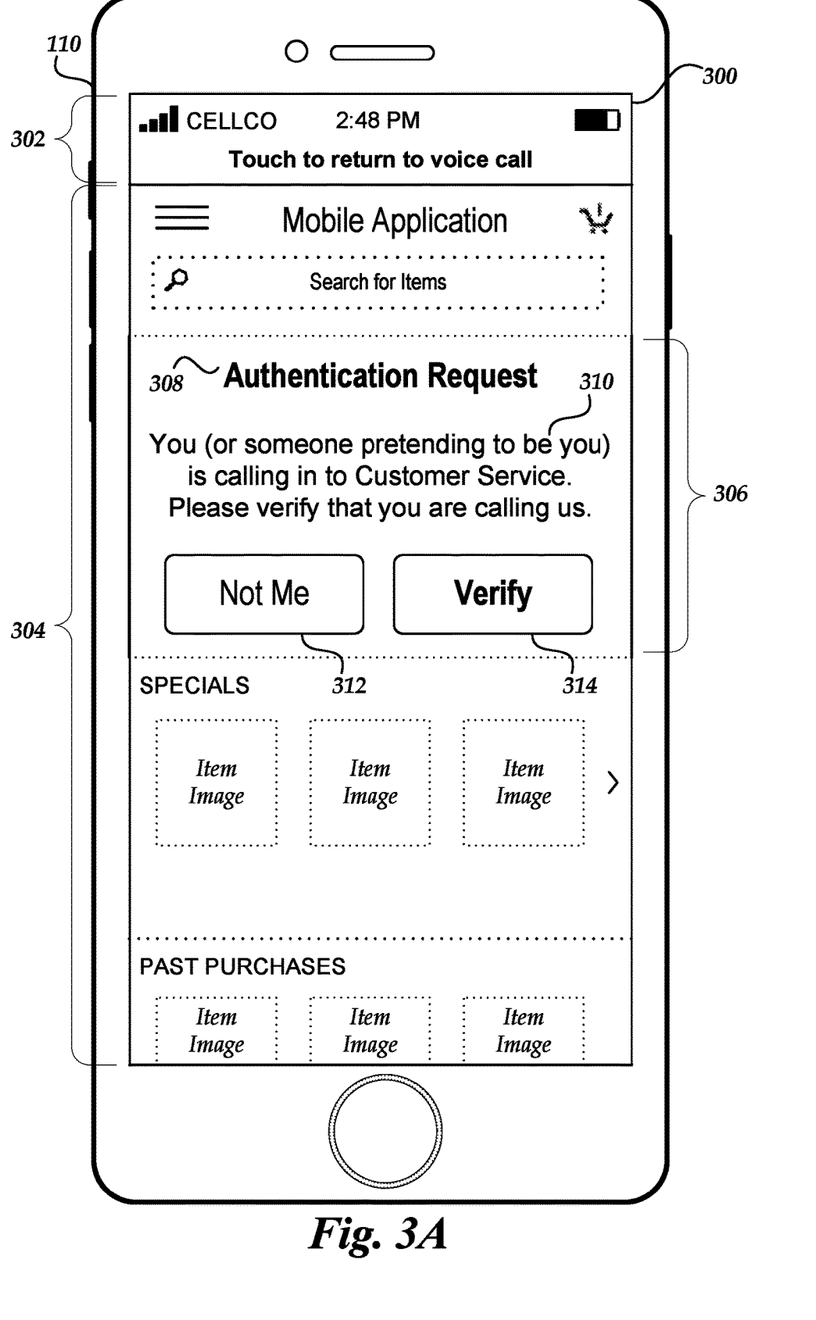
FIGS. 3A-3C are pictorial diagrams depicting illustrative user interfaces for authenticating users in accordance with aspects of the present disclosure.

FIG. 3A is a pictorial diagram of an illustrative mobile computing device 110, which displays an illustrative user interface 300 for collecting user authentication information in accordance with aspects of the present disclosure. The mobile computing device 110 is described in more detail with reference to FIG. 5 below. The illustrative user interface 300 may optionally include a call status indicator 302, which indicates that a telephone call is in progress. The telephone call may be, for example, a call placed to a customer service center or a technical support hotline. The user interface 300 may further include a mobile application user interface 304, which may display various user interface elements.

The mobile application user interface 304 may include an authentication request message 306. The authentication request message 306 may include, for example, a request title 308, a request description 310, a authentication denial control 312, and an authentication confirmation control 314. In some embodiments, as described above, the authentication request message 306 may prompt the user to enter a password, answer a security question, scan a fingerprint, say a phrase, take a photograph, or otherwise provide information that can be used to authenticate the user. In other embodiments, selecting the authentication confirmation control 314 may cause display of a further user interface, which may enable user entry of some or all of the aforementioned authentication information.

It will be understood that the user interface 300 is provided for purposes of example, and that the user interface elements described with reference to FIG. 3A may be varied without departing from the scope of the present disclosure.

Figure 3B:
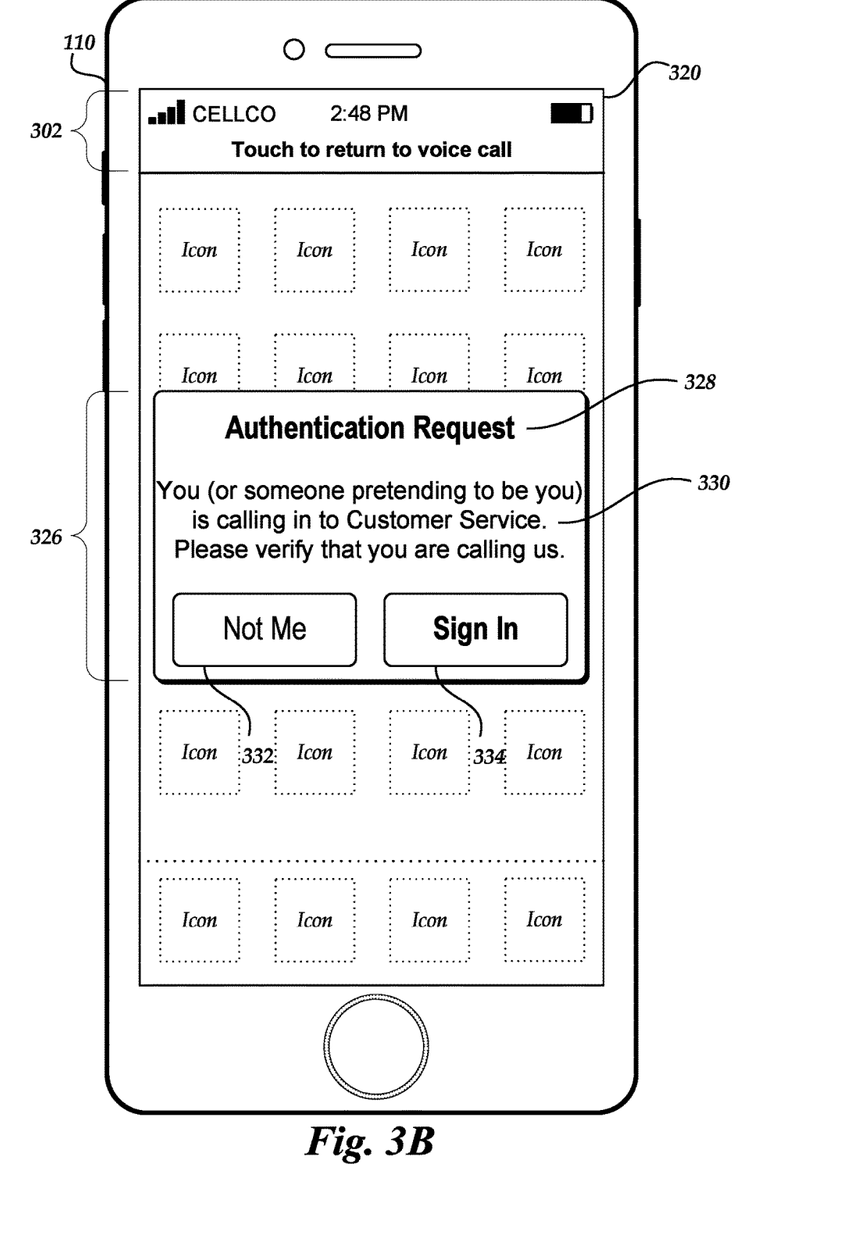

FIG. 3B is a pictorial diagram of the mobile computing device 110 displaying a second illustrative user interface 320 in accordance with aspects of the present disclosure. The second user interface 320 may include a call status indicator 302 as described above, and may further include an authentication request message 326, which may be displayed as a floating window or modal dialog above other elements of the user interface 320. The authentication request message 326 may include a request title 328, request description 330, and an authentication denial control 332, which may function similarly to the controls 308-312 described with reference to FIG. 3A.

The authentication request message 326 may further include a mobile application sign-in control 334, which may enable display of a mobile application user interface that enables collection of authentication information. Illustratively, in some embodiments, the user interface 300 of FIG. 3A may be displayed when the user is already logged into an application on the mobile computing device 110 that has the ability to authenticate the user, and the user interface 320 of FIG. 3B may be displayed when such an application is installed on the mobile computing device 110, but the user is not logged into the application or the application is not in the foreground.

In some embodiments, the second user interface 320 may be displayed as a notification, an alert, or in another format specified by an operating system or user interface module of the mobile computing device 110. For example, the mobile computing device 110 may have a standard user interface for displaying push notifications, and the authentication request message 326 may be displayed within that user interface.

It will be understood that the user interface 320 is provided for purposes of example, and that the user interface elements described with reference to FIG. 3B may be varied without departing from the scope of the present disclosure.

Figure 3C:
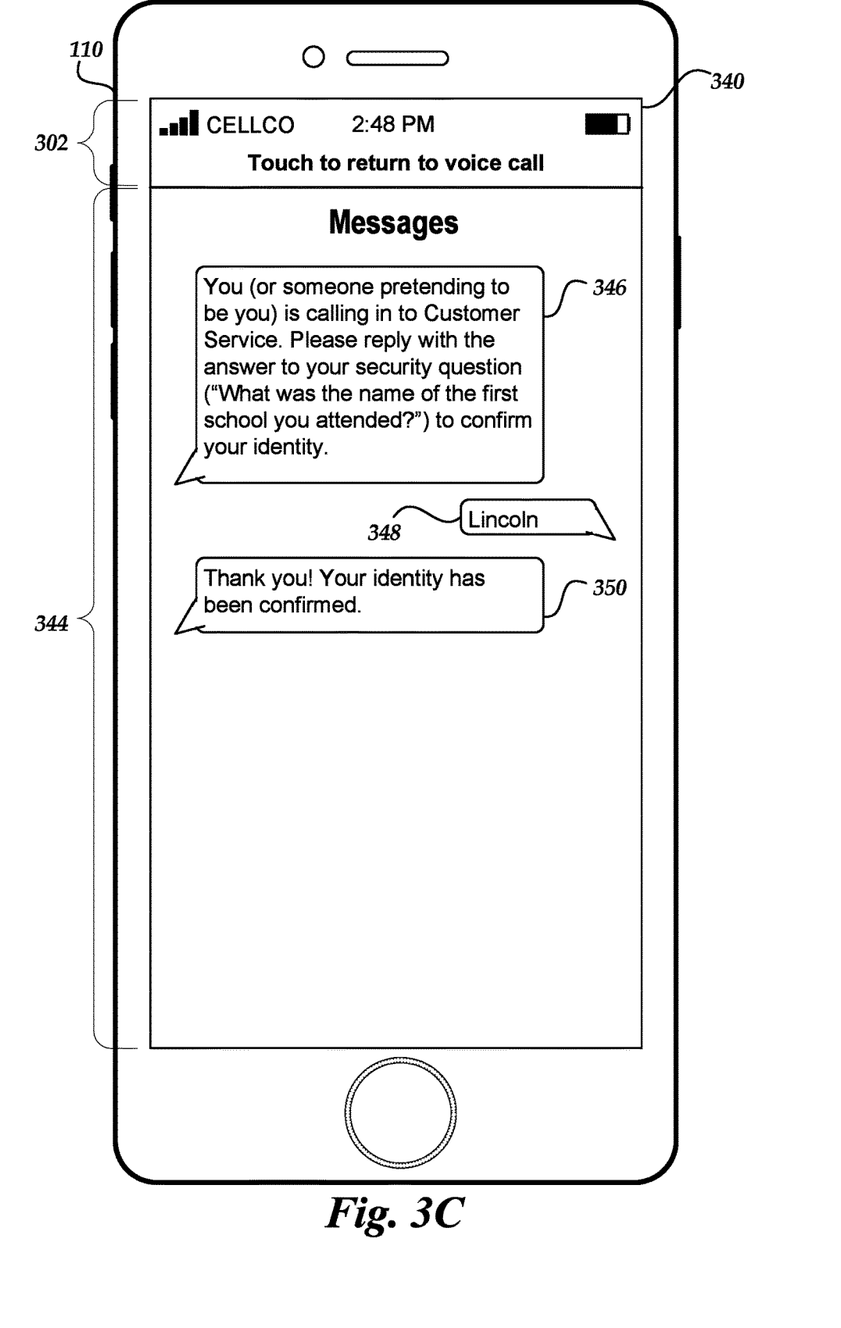

FIG. 3C is a pictorial diagram of the mobile computing device 110 displaying a third user interface 340 in accordance with aspects of the present disclosure. The third user interface 340 may include a call status indicator 302 as described above, and may further include a messaging application user interface 344. Illustratively, the messaging application user interface 344 may be displayed by a messaging application on the mobile computing device 110, which in various embodiments may be a native application (e.g., an SMS or MMS application provided with the mobile computing device 110), an operator-provided application that is installed by the user on the mobile computing device 110, or a third-party application that is separately installed by the user on the mobile computing device 110.

The messaging application user interface 344 may include an authentication request message 346. Illustratively, the authentication request message 346 may include descriptive text, a security question, or other information that prompts the user to authenticate. In some embodiments, the messaging application user interface 344 may further include an authentication response message 348, which displays the information provided by the user in response to the authentication request message 346. In the illustrated embodiment, the authentication request message 346 contains an account security question ("What was the name of the first school you attended?"), and the authentication response message 348 contains an answer to the account security question ("Lincoln"). In further embodiments, the messaging application user interface 344 may further include an authentication confirmation message 350, which indicates to the user that authentication was successful.

It will be understood that the user interface 320 is provided for purposes of example, and that the user interface elements described with reference to FIG. 3B may be varied without departing from the scope of the present disclosure. For example, the authentication request message 346 may prompt the user to enter a PIN, a temporary passcode from a security token, to take and send a photograph that contains user identifying information, to respond "yes" or "no," or provide other information that can be used to authenticate the user.

Figure 4:
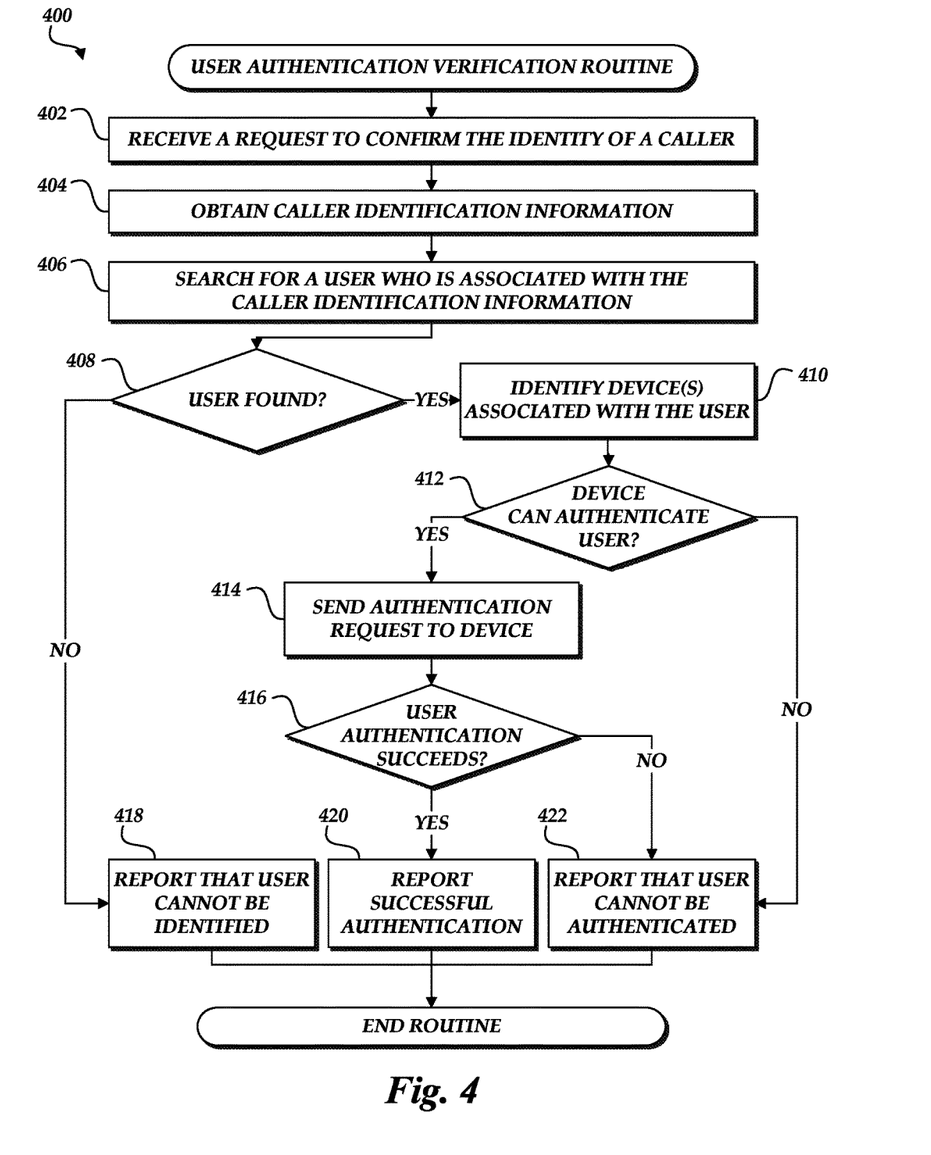
FIG. 4 is a flow diagram depicting an illustrative user authentication verification routine that may be implemented by a user authentication verification service in accordance with aspects of the present disclosure.

FIG. 4 is a flow diagram depicting an illustrative user authentication verification routine 400. The illustrative routine 400 may be carried out in whole or in part, for example, by the user authentication verification service 124 of FIG. 2. At block 402, a request may be received to confirm the identity of a caller. As described above, in various embodiments, the caller may be any party who engages in unauthenticated communication. At block 404, caller identification information may be obtained. In some embodiments, the request received at block 402 may contain caller identification information, in which case the information is obtained from the request. In other embodiments, information identifying the caller, or information identifying a device associated with the call, may be obtained from the caller, the network used to place the call, the device used to place the call, or other sources.

At block 406, a search may be conducted for a user associated with the identification information. Illustratively, the routine 400 may query a database or data store, such as the user-device data store 126 of FIG. 1, to identify a user associated with the information obtained at block 404. For example, the caller identification information may be a telephone number, and the user-device data store 126 may store telephone numbers that are associated with various users. The routine 400 may thus search the user-device data store 126 for a user associated with the telephone number.

At decision block 408, a determination may be made as to whether a user could be associated with the caller identification information obtained at block 404. If not, then at block 418 a message may be output reporting that a user cannot be identified based on the supplied identification information, and the routine 400 then ends. In some embodiments, the routine 400 may include a fallback authentication routine, or may instruct the originator of the request to authenticate the caller manually. In further embodiments, the routine 400 may output the caller identification information in addition to or as part of the output message indicating that a user associated with the information cannot be identified.

If the determination at decision block 408 is that a user has been identified, then at block 410 one or more computing devices associated with the user may be identified. Illustratively, the one or more computing devices may include a computing device that was used to place the call, such as the mobile computing device 110.

At decision block 412, a determination may be made as to whether one of the devices identified at block 410 can authenticate the user. As described above, in some embodiments, the determination may be that an application is installed on one of the devices, and that the application can authenticate the user. In various further embodiments, the determination may be that more than one device can authenticate the user, and the routine 400 may determine a particular device, a set of devices, or to use all of the devices. For example, the routine 400 may determine that the device used to place the call can authenticate the user, and further determine to use that device. As further examples, the routine 400 may determine that a particular device is the user's preferred device, was used more recently than other devices, is at a particular location, or user other criteria to determine a device or devices.

If the determination at decision block 412 is that none of the identified devices can authenticate the user, then at 422 a message may be output indicating that the user cannot be authenticated, and the routine ends. Otherwise, at block 414, an authentication request may be sent to the device(s) determined at decision block 412. As described above, the authentication request may contain information that enables the device to authenticate the user, or may request that the device use built-in functionality (e.g., a fingerprint reader, voiceprint reader, camera, etc.) or already-stored information to authenticate the user. As further described above, in various embodiments, the request may be sent as a push notification, text message, or other message.

At decision block 416, a determination may be made as to whether the user was successfully authenticated. In some embodiments, the determination may be made by evaluating information received from the device. For example, an answer to an account security question may be received, and the routine 400 may verify whether the answer was correct. In other embodiments, the device may report that user authentication was successful without providing further information.

If the determination at decision block 416 is that the user was successfully authenticated, then at block 420 a message may be output indication that authentication was successful. Illustratively, output of a "success" message may indicate that the caller's identity corresponds to the stored user identity (i.e., that the caller is in fact the user), or that the caller has been authorized by the user to act on the user's behalf.

If the determination at decision block 416 is instead that the user was not successfully authenticated, at block 422 a message may be output reporting that authentication was not successful, and the routine 400 then ends. In some embodiments, the routine 400 may distinguish between reporting that the user cannot be authenticated (e.g., because no device was available that had the capability to authenticate the user) and reporting that the user did not authenticate (e.g., because the user explicitly declined, or because an account security question was answered incorrectly). In other embodiments, the routine 400 may only report success or failure, without distinguishing between callers who could not be identified, callers who could not be authenticated, and callers who were not authenticated.

It will be understood that the terms "caller," "party," and "user," as used herein, may refer to the same person or entity at different times, as the identity of the calling party is confirmed to be that of the user associated with the identification information. For example, the "caller" associated with the request at block 402 of the routine 400 may be the same person or entity as the "user" at decision block 408. It will further be understood that the "caller" and "user" may be different people or entities, and that the success or failure of user authentication may depend on whether the caller and user are the same person or entity.

In various embodiments, the blocks of the routine 400 may be combined, omitted, varied, or carried out in various orders. For example, blocks 402 and 404 may be combined, and the request may include caller identification information. As a further example, the search at block 406 may be for a device associated with the caller identification information, and at block 410 a user associated with the device may be identified. The routine 400 is thus understood to be illustrative and not limiting.

Figure 5:
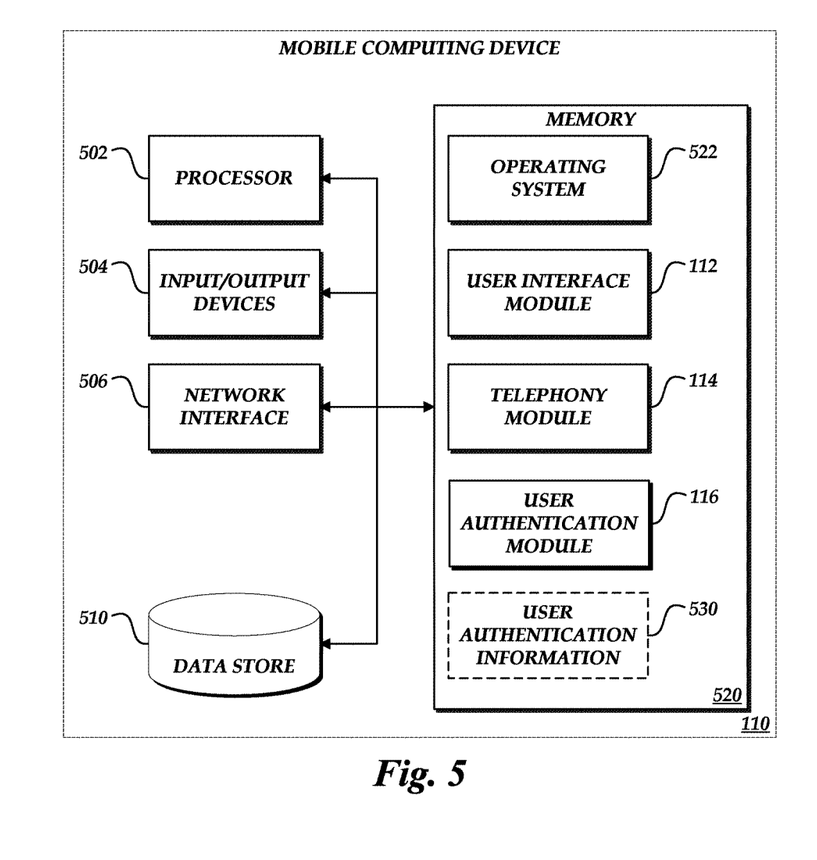
FIG. 5 is a block diagram depicting a general architecture of an example mobile computing device for implementing aspects of the present disclosure.

FIG. 5 depicts a general architecture of the mobile computing device 110, which includes an arrangement of computer hardware and software components that may be used to implement aspects of the present disclosure. The mobile computing device 110 may include many more (or fewer) elements than those shown in FIG. 5. It is not necessary, however, that all of these elements be shown in order to provide an enabling disclosure.

As illustrated, the mobile computing device 110 includes a processor 502, input/output devices 504, a network interface 506, and a data store 510, all of which may communicate with one another by way of a communication bus. The network interface 506 may provide connectivity to one or more networks (such as network 130) or computing systems and, as a result, may enable the mobile computing device 110 to receive and send information and instructions from and to other computing systems or services, such as the call center computing device 122 or the user authentication verification service 124. In some embodiments, the mobile computing device 110 may be configured to process requests from the user authentication verification service 124, such as requests to authenticate a user as described above.

The processor 502 may also communicate to and from a memory 520. The memory 520 may contain computer program instructions (grouped as modules or components in some embodiments) that the processor 502 may execute in order to implement one or more embodiments. The memory 520 generally includes RAM, ROM, and/or other persistent, auxiliary, or non-transitory computer-readable media. The memory 520 may store an operating system 522 that provides computer program instructions for use by the processor 502 in the general administration and operation of the mobile computing device 110. The memory 520 may further store specific computer-executable instructions and other information (which may be referred to herein as "modules") for implementing aspects of the present disclosure. For example, the memory 520 may include the user interface module 112, which may perform various operations with regard to displaying the user interfaces described herein. For example, the user interface module 112 may manage the display of user interfaces 300, 320, and 340 as described above.

In some embodiments, the memory 520 may include a telephony module 114 and a user authentication module 116, which may be executed by the processor 502 to perform various operations, such as those operations described with reference to FIG. 4. The memory 520 may further include user authentication information 530, which may be loaded into the memory 420 as various operations are performed. In some embodiments, the user authentication information 530 may be obtained from the user authentication information 530 via the network 130. In other embodiments, the user authentication information 530 may be obtained from the data store 510 or the input/output devices 504.

While the operating system 522, the user interface module 112, the telephony module 114, and the user authentication module 116 are illustrated as distinct modules in the memory 520, in some embodiments, the user interface module 112, the telephony module 114, and the user authentication module 116 may be incorporated as modules in the operating system 522 or another application or module, and as such, separate modules may not be required to implement some embodiments. In some embodiments, the user interface module 112, the telephony module 114, and the user authentication module 116 may be implemented as parts of a single application.

It will be recognized that many of the components described in FIG. 5 are optional and that embodiments of the mobile computing device 110 may or may not combine components. Furthermore, components need not be distinct or discrete. Components may also be reorganized. For example, the mobile computing device 110 may be represented in a single physical device or, alternatively, may be split into multiple physical devices. In some embodiments, components illustrated as part of the mobile computing device 110 (such as the input/output devices 504) may additionally or alternatively be included in other computing devices, such that some aspects of the present disclosure may be performed by the mobile computing device 110 while other aspects are performed by another computing device.

Figure 6:
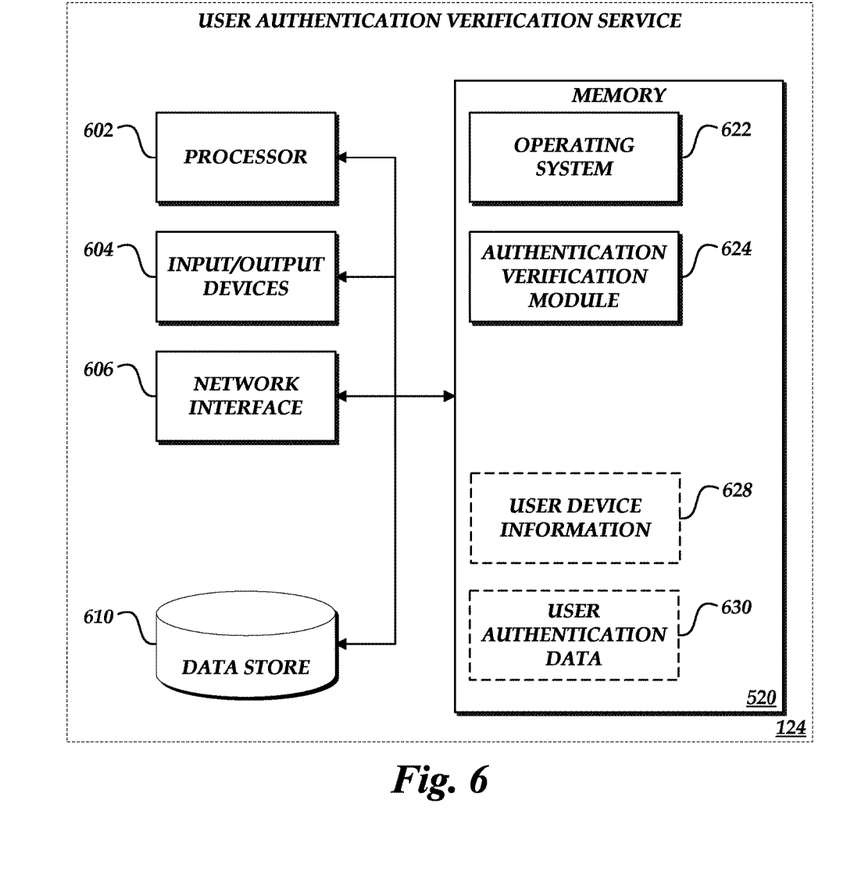
FIG. 6 is a block diagram depicting a general architecture of an example computing device for implementing a user authentication verification service in accordance with aspects of the present disclosure.

FIG. 6 depicts a general architecture of the user authentication verification service 124, which includes an arrangement of computer hardware and software components that may be used to implement aspects of the present disclosure. The user authentication verification service 124 may include many more (or fewer) elements than those shown in FIG. 6. It is not necessary, however, that all of these elements be shown in order to provide an enabling disclosure.

As illustrated, the user authentication verification service 124 includes a processor 602, input/output devices 604, a network interface 606, and a data store 610, all of which may communicate with one another by way of a communication bus. The network interface 606 may provide connectivity to one or more networks (such as network 130) or computing systems and, as a result, may enable the user authentication verification service 124 to receive and send information and instructions from and to other computing systems or services, such as the mobile computing device 110.

The processor 602 may also communicate to and from a memory 620. The memory 620 may contain computer program instructions (grouped as modules or components in some embodiments) that the processor 602 may execute in order to implement one or more embodiments. The memory 620 generally includes RAM, ROM, and/or other persistent, auxiliary, or non-transitory computer-readable media. The memory 620 may store an operating system 622 that provides computer program instructions for use by the processor 602 in the general administration and operation of the user authentication verification service 124. The memory 620 may further store specific modules for implementing aspects of the present disclosure.

In some embodiments, the memory 620 may include an authentication verification module 624, which may be executed by the processor 602 to perform various operations, such as those operations described with reference to FIG. 4. The memory 620 may further include user device information 628 and user authentication data 630, which may be loaded into the memory 620 as various operations are performed. In some embodiments, the user device information 628 and user authentication data 630 may be obtained from one or more external data stores, such as the user-device data store 126 and the user ID data store 128. In other embodiments, the user device information 628 and user authentication data 630 may be obtained from the data store 610.

While the operating system 622 and the authentication verification module 624 are illustrated as distinct modules in the memory 620, in some embodiments, the authentication verification module 624 may be incorporated as a module in the operating system 622 or another application or module, and as such, separate modules may not be required to implement some embodiments.

It will be recognized that many of the components described in FIG. 6 are optional and that embodiments of the user authentication verification service 124 may or may not combine components. Furthermore, components need not be distinct or discrete. Components may also be reorganized. For example, the user authentication verification service 124 may be represented in a single physical device or, alternatively, may be split into multiple physical devices. In some embodiments, components illustrated as part of the user authentication verification service 124 (such as the input/output devices 604) may additionally or alternatively be included in other computing devices, such that some aspects of the present disclosure may be performed by the user authentication verification service 124 while other aspects are performed by another computing device.

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising
   a data store configured to store at least user information and device information; and
   a processor in communication with the data store, the processor executing specific computer-executable instructions that configure the processor to at least:
   receive, from a call center computing device associated with a call center, a request to confirm an identity of a first party, wherein the first party initiates a telephone call to the call center, and wherein the request to confirm the identity of the first party includes at least a telephone number associated with the telephone call;
   identify, based at least in part on the telephone number, the user information, and the device information, a plurality of devices associated with a first user of a service associated with the call center;
   identify, based at least in part on device information for the plurality of devices associated with the first user, a first device of the plurality of devices, wherein a first application on the first device can authenticate the first user;
   transmit a push notification to the first device, wherein the push notification causes the first application to authenticate the first user;
   receive, from the first device, information processed by the first application in response to the push notification;
   identify the first party as the first user based at least in part on the information processed by the first application; and
   transmit, to the call center computing device, confirmation of the identity of the first party.

2. The system of claim 1, wherein the processor is further configured to at least determine that a second device of the plurality of devices can authenticate the first user.

3. The system of claim 2, wherein the processor is further configured to at least:
   determine that the telephone number is associated with the first device; and
   select the first device to receive the request to authenticate the first user based at least in part on the telephone number being associated with the first device.

4. The system of claim 1, wherein the processor is further configured to at least determine that the first application is installed on the first device.

5. The system of claim 4, wherein the processor is further configured to at least determine that the first application has authenticated the first user within a specified time interval.

6. A computer-implemented method comprising:
   as implemented by one or more computing devices configured with specific executable instructions,
   receiving a request to confirm an identity of a first party, wherein the first party is communicating via an unauthenticated channel, and wherein the request includes at least a first identifier;
   identifying, based at least in part on the first identifier and a data store that associates users with identifiers, a plurality of devices associated with a first user, wherein the first user is associated with the first identifier;
   determining that a first application on a first device of the plurality of devices can authenticate the first user;
   transmitting, to the first device, a request to authenticate the first user via the first application;
   receiving, from the first device, information processed by the first application in response to the request to authenticate the first user;
   identifying the first party as the first user based at least in part on the information processed by the first application; and
   transmitting, in response to the request to confirm the identity of the first party, information confirming that the identity of the first party corresponds to the first user.

7. The computer-implemented method of claim 6, wherein the information processed by the first application comprises at least one of an account password, a personal identification number (PIN), an answer to a security question, a fingerprint, or a voiceprint.

8. The computer-implemented method of claim 6, wherein the information processed by the first application is received via a secure communications channel.

9. The computer-implemented method of claim 6, wherein the request to confirm the identity of the first party is received from the first device.

10. The computer-implemented method of claim 6 further comprising determining that the first user has not been authenticated within a specified time interval.

11. The computer-implemented method of claim 6, wherein the first application comprises at least one of a web browser, item browser, or media player.

12. The computer-implemented method of claim 6, wherein the request to confirm the identity of the first party comprises one or more of a push notification or a text message.

13. The computer-implemented method of claim 6, wherein the first identifier is a user identifier.

14. The computer-implemented method of claim 13, wherein the request to confirm the identity of the first party further comprises a device identifier, the computer-implemented method further comprising:
   identifying the first device based at least in part on the device identifier; and
   associating the first device with the first user based at least in part on the request to confirm the identity of the first party.

15. The computer-implemented method of claim 14 further comprising storing that the first device is associated with the first user in the data store.

16. The computer-implemented method of claim 14, wherein the device identifier comprises one or more of a telephone number, an IMEI, a MAC address, or a geographic location associated with the first device.

17. A system comprising:
a data store configured to store at least user information and device information; and
a processor in communication with the data store, the processor executing specific computer-executable instructions that configure the processor to at least:
receive a request to confirm an identity of a first party, wherein the first party communicates via an unauthenticated channel, and wherein the request includes at least a first identifier;
identify, based at least in part on the first identifier and the user information, a plurality of devices associated with a first user, wherein the first user is associated with the first identifier;
determine, based at least in part on the device information, that a first application on a first device of the plurality of devices can authenticate the first user;
transmit, to the first device, an authentication request;
receive, from the first device, authentication information in response to the authentication request;
determine that the authentication information authenticates the first user; and
transmit, in response to the request to confirm the identity of the first party, information confirming the identity of the first party.

18. The system of claim 17, wherein the processor is further configured to at least determine that the first application is installed on the first device.

19. The system of claim 18, wherein the processor is further configured to at least determine that the first user is logged into the first application.

20. The system of claim 18, wherein the processor is further configured to at least determine that the first user is not logged into the first application, and wherein the authentication request comprises a request for the first user to log into the first application.

* * * * *